United States Patent
Hitchcock et al.

(10) Patent No.: US 12,418,149 B2
(45) Date of Patent: Sep. 16, 2025

(54) CHARGING INLET ASSEMBLY HAVING A PROXIMITY RESISTOR ASSEMBLY

(71) Applicant: TE Connectivity Solutions GmbH, Schaffhausen (CH)

(72) Inventors: Matthew Bryan Hitchcock, Hershey, PA (US); Hurley Chester Moll, Hershey, PA (US); Kevin John Peterson, Kernersville, NC (US); Clara Marguerite Rhodes, Winston Salem, NC (US); Aaron James de Chazal, Rochester, MI (US)

(73) Assignee: TE Connectivity Solutions GmbH (CH)

( * ) Notice: Subject to any disclaimer, the term of this patent is extended or adjusted under 35 U.S.C. 154(b) by 629 days.

(21) Appl. No.: 17/883,751

(22) Filed: Aug. 9, 2022

(65) Prior Publication Data

US 2023/0059653 A1    Feb. 23, 2023

Related U.S. Application Data

(60) Provisional application No. 63/234,668, filed on Aug. 18, 2021.

(51) Int. Cl.
*H01R 13/717*  (2006.01)
*B60L 53/16*   (2019.01)
*H01R 13/66*   (2006.01)

(52) U.S. Cl.
CPC .......... *H01R 13/7175* (2013.01); *B60L 53/16* (2019.02); *H01R 13/6616* (2013.01); *H01R 2201/26* (2013.01)

(58) Field of Classification Search
CPC .. H01R 13/6616; H01R 2201/26; B60L 53/16
USPC ....................................................... 320/109
See application file for complete search history.

(56) References Cited

U.S. PATENT DOCUMENTS

2012/0032634 A1* 2/2012 Cavanaugh ............. B60L 58/21
                                                    320/109
2022/0085557 A1* 3/2022 Rhodes ............. H01R 13/6675

FOREIGN PATENT DOCUMENTS

CN          115708276 A  *  2/2023  ............. B60L 53/16

* cited by examiner

*Primary Examiner* — Suresh Memula

(57) ABSTRACT

A charging inlet assembly includes a housing having a DC section with DC terminals received in DC terminal channels for mating with a DC charging connector and AC terminals, including a proximity terminal, received in AC terminal channels for mating with an AC charging connector. The charging inlet assembly includes an HMI assembly coupled to the rear of the housing having a control circuit board, a charging indicator coupled to the control circuit board visible from the front of the housing to indicate a charging status of the charging inlet assembly, and a proximity resistor assembly coupled to the housing. The proximity resistor assembly includes a resistor coupled to the control circuit board and a cable connector connected between the control circuit board and the proximity terminal.

20 Claims, 5 Drawing Sheets

CHARGING INLET ASSEMBLY HAVING A PROXIMITY RESISTOR ASSEMBLY

CROSS REFERENCE TO RELATED APPLICATIONS

This application claims priority to U.S. Provisional Application No. 63/234,668, filed 18 Aug. 2021, the subject matter of which is herein incorporated by reference in its entirety.

BACKGROUND OF THE INVENTION

The subject matter herein relates generally to charging inlet assemblies.

Charging inlet assemblies are used to charge vehicles, such as for charging a battery system of an electric vehicle (EV) or hybrid electric vehicle (HEV). The charging inlet assembly includes power connectors for connecting to a charging connector. Conventional charging inlet assemblies include AC terminals and DC terminals. The AC terminals and the DC terminals are housed within an inlet housing, which interfaces with the charging connector. The inlet housing is coupled to the vehicle. Cable harnesses are coupled to the AC terminals and the DC terminals and extend to other system components, such as the battery. Standards for electrical connectors for electric vehicles, such as the SAE J1772 North American Standard, have signaling protocols to detect connection of the charging plug to the vehicle. For example, the charging inlet assembly typically includes a control circuit board retained within the housing. The control circuit board includes a proximity circuit having a resistor connected between the proximity signal and the ground. The housing includes a large pocket at the rear of the housing that receives the control circuit board. The pocket and the control circuit board increase the overall size, complexity and cost of the charging inlet assembly.

A need remains for an improved charging inlet assembly.

BRIEF DESCRIPTION OF THE INVENTION

In one embodiment, a charging inlet assembly is provided and includes a housing extending between a front and a rear. The housing has a DC section includes DC terminal channels. The housing has an AC section includes AC terminal channels. The DC section configured for mating with a DC charging connector at the front. The AC section configured for mating with an AC charging connector at the front. The charging inlet assembly includes DC terminals received in the corresponding DC terminal channels for mating with the DC charging connector. The DC terminals include a proximity terminal. The charging inlet assembly includes AC terminals received in the corresponding AC terminal channels for mating with the AC charging connector. The charging inlet assembly includes a human machine interface (HMI) assembly coupled to the rear of the housing. The HMI assembly includes a control circuit board. The HMI assembly includes a charging indicator coupled to the control circuit board. The charging indicator is visible from the front of the housing to indicate a charging status of the charging inlet assembly. The charging inlet assembly includes a proximity resistor assembly coupled to the housing. The proximity resistor assembly includes a resistor coupled to the control circuit board. The proximity resistor assembly includes a cable connector connected between the control circuit board and the proximity terminal.

In another embodiment, a charging inlet assembly is provided and includes a housing extending between a front and a rear. The housing has a DC section includes DC terminal channels. The housing has an AC section includes AC terminal channels. The housing has a human machine interface (HMI) section discrete from the DC section and the AC section. The DC section configured for mating with a DC charging connector at the front. The AC section configured for mating with an AC charging connector at the front. The housing includes a rear cavity at the HMI section. The rear cavity is separate from the DC terminal channels and from the AC terminal channels. The charging inlet assembly includes DC terminals received in the corresponding DC terminal channels for mating with the DC charging connector. The DC terminals include a proximity terminal. The charging inlet assembly includes AC terminals received in the corresponding AC terminal channels for mating with the AC charging connector. The charging inlet assembly includes an HMI assembly received in the rear cavity. The HMI assembly includes a control circuit board. The HMI assembly includes a charging indicator coupled to the control circuit board. The charging indicator located within the HMI section and is visible from the front of the housing to indicate a charging status of the charging inlet assembly. The charging inlet assembly includes a proximity resistor assembly coupled to the housing. The proximity resistor assembly includes a resistor coupled to the control circuit board. The proximity resistor assembly includes a cable connector connected between the control circuit board and the proximity terminal.

In a further embodiment, a charging inlet assembly is provided and includes a housing extending between a front and a rear. The housing has a DC section includes DC terminal channels. The housing has an AC section includes AC terminal channels. The DC section configured for mating with a DC charging connector at the front. The AC section configured for mating with an AC charging connector at the front. The charging inlet assembly includes DC terminals received in the corresponding DC terminal channels for mating with the DC charging connector. The DC terminals include a proximity terminal. The charging inlet assembly includes AC terminals received in the corresponding AC terminal channels for mating with the AC charging connector. The charging inlet assembly includes a human machine interface (HMI) assembly coupled to the rear of the housing. The HMI assembly includes a control circuit board. The HMI assembly includes a charging indicator coupled to the control circuit board. The charging indicator is visible from the front of the housing to indicate a charging status of the charging inlet assembly. The charging inlet assembly includes a proximity resistor assembly coupled to the housing. The proximity resistor assembly includes a resistor and a cable connector. The resistor coupled to a proximity circuit of the control circuit board. The resistor coupled to a ground of the control circuit board. The cable connector includes a contact connected to the proximity circuit of the control circuit board. The cable connector includes a cable connected between the contact and the proximity terminal to receive a proximity signal from the proximity terminal.

DETAILED DESCRIPTION OF THE INVENTION

Figure 1:
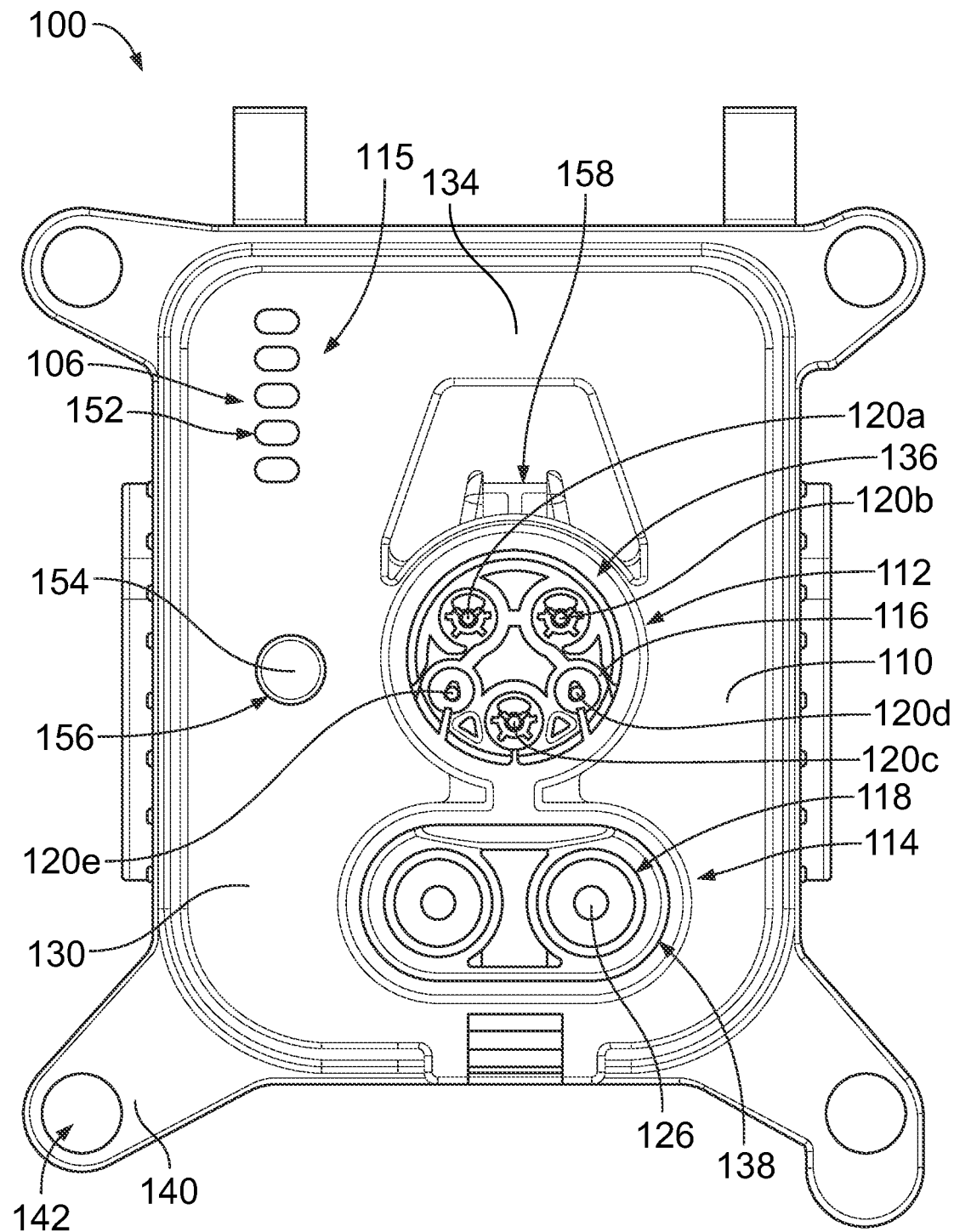
FIG. 1 is a front view of a charging inlet assembly including an AC charging module, a DC charging module, a human machine interface (HMI) assembly, and a proximity resistor assembly in accordance with an exemplary embodiment.
Figure 2:
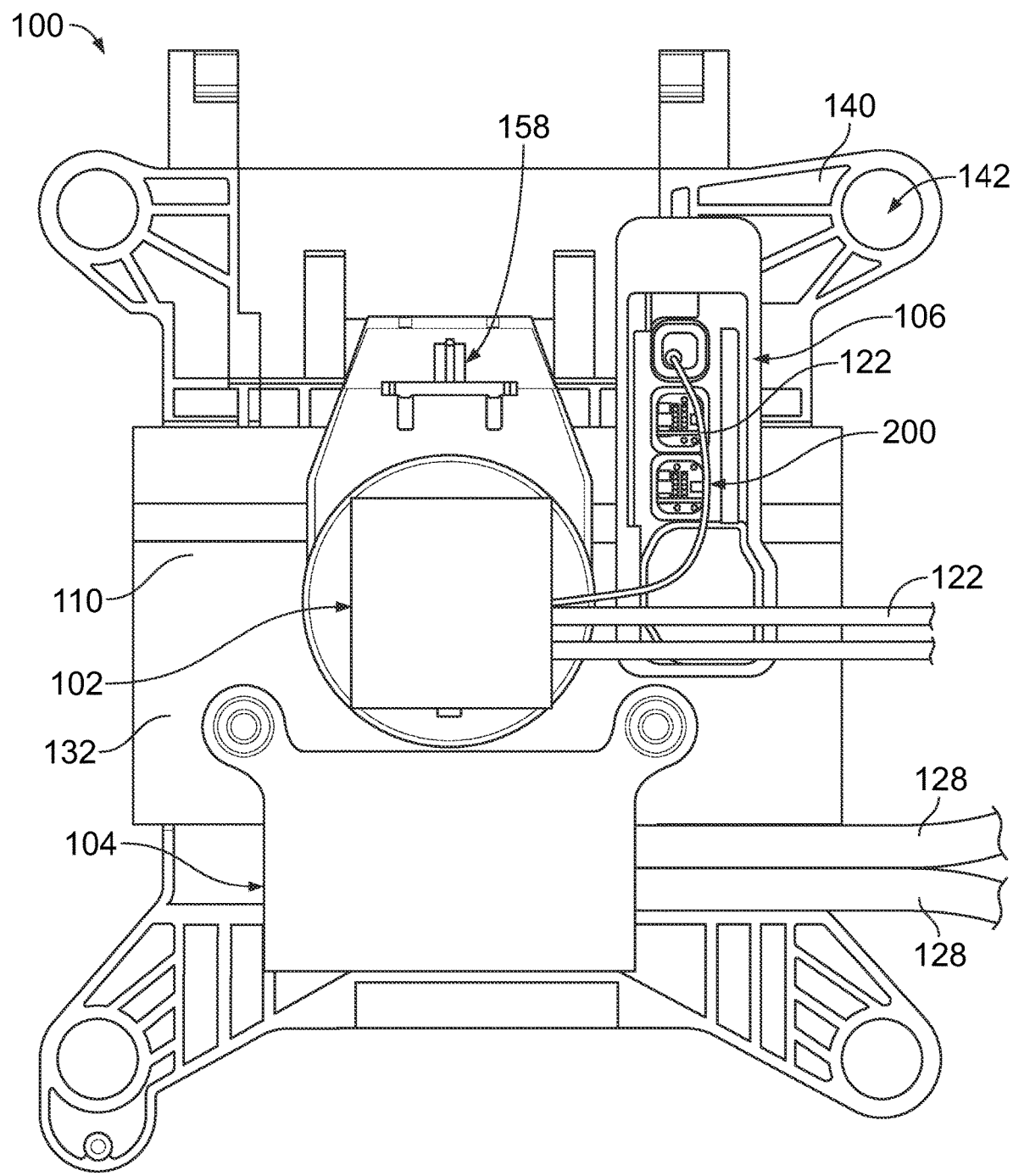
FIG. 2 is a rear view of the charging inlet assembly showing the AC charging module, the DC charging module, a human machine interface (HMI) assembly, and a proximity resistor assembly in accordance with an exemplary embodiment.
Figure 3:
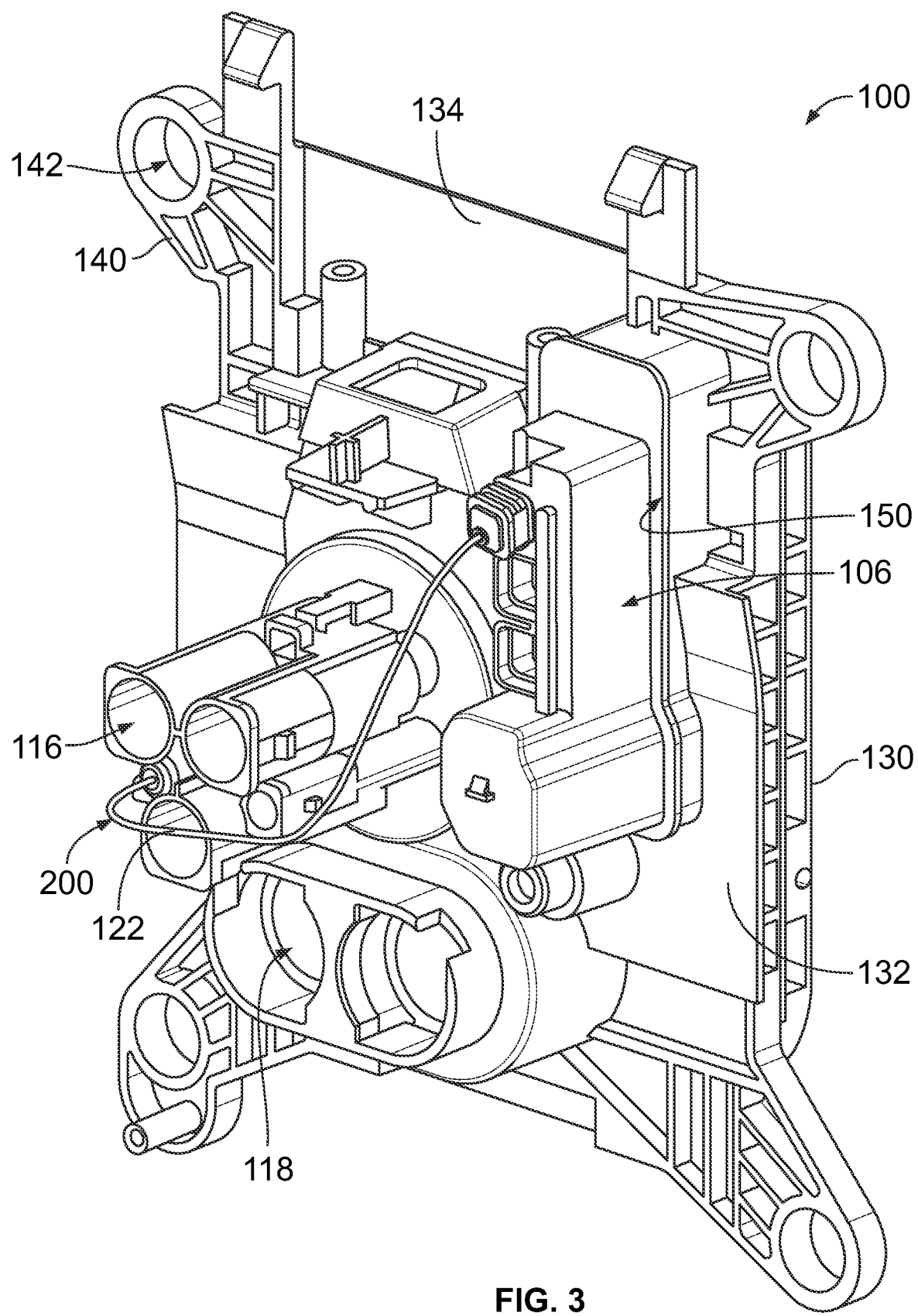
FIG. 3 is a rear perspective view of the charging inlet assembly showing the AC charging module, the DC charging module, a human machine interface (HMI) assembly, and a proximity resistor assembly in accordance with an exemplary embodiment.

FIG. 1 is a front view of a charging inlet assembly 100 including an AC charging module 102, a DC charging module 104, a human machine interface (HMI) assembly 106, and a proximity resistor assembly 200 in accordance with an exemplary embodiment. FIG. 2 is a rear view of the charging inlet assembly 100 showing the AC charging module 102, the DC charging module 104, a human machine interface (HMI) assembly 106, and a proximity resistor assembly 200 in accordance with an exemplary embodiment. FIG. 3 is a rear perspective view of the charging inlet assembly 100 showing the AC charging module 102, the DC charging module 104, a human machine interface (HMI) assembly 106, and a proximity resistor assembly 200 in accordance with an exemplary embodiment.

The charging inlet assembly 100 is used as a charging inlet for a vehicle, such as an electric vehicle (EV) or hybrid electric vehicle (HEV). The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the AC charging module 102 and the DC charging module 104 for mating with the charging connector. In various embodiments, the AC charging module 102 and/or the DC charging module 104 are removable from the housing 110. For example, the charging modules 102 may be coupled to the housing 110 using latches, fasteners, clips, or other securing means. The charging modules 102, 104 may be removable from the housing 110 to separate components of the charging modules 102, 104 (for example, charging pins, cables, circuit boards, and the like) from the housing 110, such as for repair and/or replacement of the charging module components or other components of the charging inlet assembly 100.

In an exemplary embodiment, the housing 110 includes an AC section 112 that receives the AC charging module 102 and a DC section 114 that receives the DC charging module 104. The housing 110 includes an HMI section 115 separate from the AC section 112 and the DC section 114. In the illustrated embodiment, the HMI section 115 is located to a first side of the AC section 112 and the DC section 114. For example, the HMI section 115 is between a left side of the housing 110 and the AC/DC sections 112, 114. The HMI assembly 106 is coupled to the housing 110 at the HMI section 115. The HMI section 115 includes indicators, inputs, buttons, or other components for interface by the operator. The AC section 112 is configured for mating with an AC charging connector or an AC section of the charging connector. The DC section 114 is configured for mating with a DC charging connector or a DC section of the charging connector. The AC section 112 includes AC terminal channels 116. The DC section 114 includes DC terminal channels 118.

The charging inlet assembly 100 includes AC terminals 120 at the AC section 112. The AC terminals 120 are held by the housing 110. The AC terminals 120 are received in corresponding AC terminal channels 116. In various embodiments, the AC terminals 120 may be part of the AC charging module 102 that is coupled to the housing 110. In the illustrated embodiment, five AC terminals 120 are provided, including a first AC charging terminal 120a, a second AC charging terminal 120b, a ground terminal 120c, a proximity terminal 120d, and a pilot terminal 120e. Optionally, the AC terminals 120 may be different sized terminals. In an exemplary embodiment, the AC terminals 120 includes pins at mating ends of the AC terminals 120. AC cables 122 are terminated to the AC terminals 120 and extend from the charging inlet assembly 100 to another component of the vehicle, such as the battery system of the vehicle. The AC terminals 120 are configured to be mated to the charging connector.

In an exemplary embodiment, the AC section 112 of the charging inlet assembly 100 defines a low-voltage connector configured to be coupled to the low-voltage portion of the charging connectors. The low-voltage connector (for example, the AC terminals 120 and the AC cables 122) is configured to be coupled to other components in the system, such as a battery distribution unit, to control charging of the vehicle. The low-voltage connector may transmit/receive signals relating to charging, such as status of connection, status of charge, voltage of charge, and the like. The low-voltage connector may be socket connector configured to receive the charging plug. Seals may be provided at the interface of the low-voltage connector.

The charging inlet assembly 100 includes DC terminals 126 at the DC section 114. The DC terminals 126 are held by the housing 110. The DC terminals 126 are received in corresponding DC terminal channels 118. In various embodiments, the DC terminals 126 may be part of the DC charging module 104 that is coupled to the housing 110. In the illustrated embodiment, two DC terminals 126 are provided. In an exemplary embodiment, the DC terminals 126 includes pins at mating ends of the DC terminals 126. DC cables 128 are terminated to the DC terminals 126 and extend from the charging inlet assembly 100 to another component of the vehicle, such as the battery system of the vehicle. The DC terminals 126 are configured to be mated to the charging connector.

In an exemplary embodiment, the DC section 114 of the charging inlet assembly 100 defines a high-voltage connector configured to be coupled to the high-voltage portion of the charging connector. The high-voltage connector (for example, the DC terminals 126 and the DC cables 128) is configured to be coupled to other components in the system, such as the battery and/or the battery distribution unit of the vehicle. The high-voltage connector is used for fast charging of the battery. The high-voltage connector may be socket connector configured to receive the charging plug. Seals may be provided at the interface of the high-voltage connector.

The housing 110 includes a front 130 and a rear 132. The front 130 of the housing 110 faces outward and is presented to the operator to connect the charging connector. The rear 132 faces the interior of the vehicle and is generally inaccessible without removing the housing 110 from the vehicle. In an exemplary embodiment, the housing 110 includes a panel 134 at the front 130. In an exemplary embodiment, an AC socket 136 is formed in the panel 134 at the AC section 112 and a DC socket 138 is formed in the panel 134 at the DC section 114. The AC socket 136 incudes a space around the AC terminals 120 that receives the charging connector. During charging, the AC charging connector is plugged into the AC socket 136 to electrically connect to the AC terminals 120. The DC socket 138 includes a space around the DC terminals 126 that receive the charging connector. The DC charging connector is configured to be plugged into the DC socket 138. During charging, the DC charging connector is plugged into the DC socket 138 to electrically connect to the DC terminals 116. The panel 134 may surround the AC socket 136 and the DC socket 138 at the front 130.

In an exemplary embodiment, the housing 110 includes a rear cavity 150 at the rear 132. In the illustrated embodiment, the rear cavity 150 is provided at the HMI section 115. The rear cavity 150 receives the HMI assembly 106. In an exemplary embodiment, a portion of the proximity resistor assembly 200 received in the rear cavity 150. The rear cavity 150 is located rearward of the panel 134. The rear cavity 150 is located within the envelope (for example, outer periphery, such as side-to-side and top-to-bottom) of the housing 110. In the illustrated embodiment, the rear cavity 150 is open at the rear to receive the HMI assembly 106 through the opening at the rear. In an exemplary embodiment, the housing 110 includes a housing securing element (not shown) used to secure the HMI assembly 106 in the rear cavity 150, such as a latching element, threaded fasteners, clips or other securing elements.

In an exemplary embodiment, the housing 110 includes indicator openings 152 at the front 130. The indicator openings 152 pass through the panel 134. The HMI assembly 106 includes indicator lights at the indicator openings 152 that are visible from the front 130 of the housing 110, such as to indicate a charging status of the charging inlet assembly 100. In an exemplary embodiment, the HMI assembly 106 includes an actuator unlock button 154 at the front 130. The housing 110 including an opening 156 that receives the actuator unlock button 154. The actuator unlock button 154 is used for unlocking a latching actuator 158, which is used for latchably securing the charging connector to the housing 110.

In an exemplary embodiment, the proximity resistor assembly 200 provides a proximity circuit with a resistor between the proximity terminal 120d and the vehicle or charging control system, such as for operating a signaling protocol for performing the charging operation. In an exemplary embodiment, the resistor of the proximity resistor assembly 200 is included with the HMI assembly 106. The charging inlet assembly 100 does not include a separate circuit or circuit board housing the resistor, but rather, the resistor and proximity circuit is provided as part of the HMI assembly 106.

In an exemplary embodiment, the housing 110 includes mounting tabs 140 used for mounting the housing 110 to the vehicle. The mounting tabs 140 having openings 142 that receive fasteners (not shown) to secure the charging inlet assembly 100 to the vehicle. Other types of mounting features may be used to secure the charging inlet assembly 100 to the vehicle. In various embodiments, the charging inlet assembly 100 may include a mounting flange (not shown) coupled to the front of the housing 110 for mounting the charging inlet assembly 100 to the vehicle. The housing 110 and/or the mounting flange may include a seal (not shown) to seal the charging inlet assembly 100 to the vehicle. In various embodiments, the charging inlet assembly 100 may include a terminal cover (not shown) at the front of the housing 110 to cover portions of the housing 110, such as the DC section 114 and/or the AC section 112. The housing 110 may include one or more rear covers at the rear of the housing 110 to close access to the rear of the housing 110. The cover(s) may be clipped or latched onto the main part of the housing 110, such as using clips or latches. Other types of securing features, such as fasteners may be used in alternative embodiments.

Figure 4:
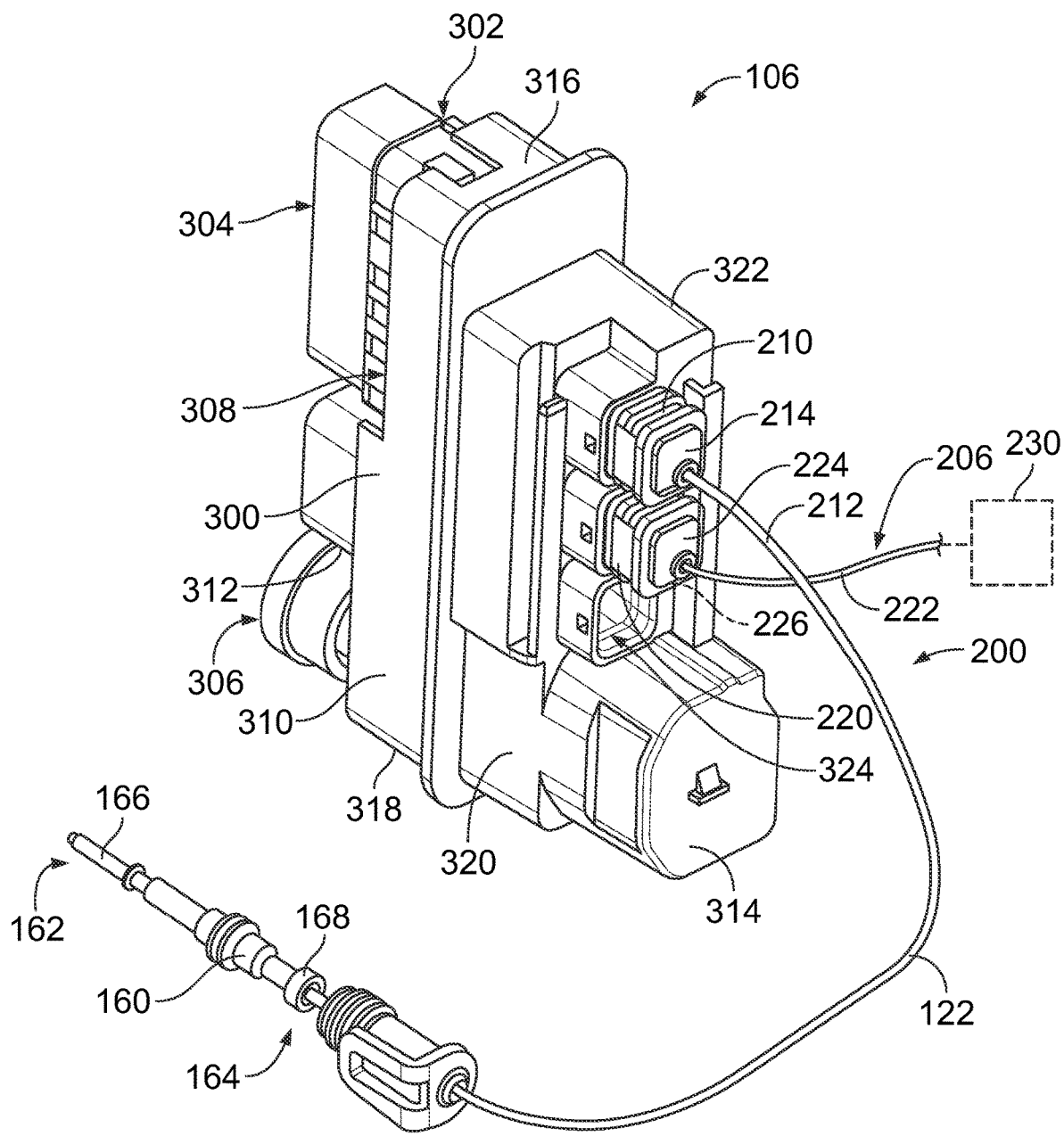
FIG. 4 is a rear perspective view of a portion of the charging inlet assembly showing the proximity resistor assembly and the human machine interface (HMI) assembly in accordance with an exemplary embodiment.
Figure 5:
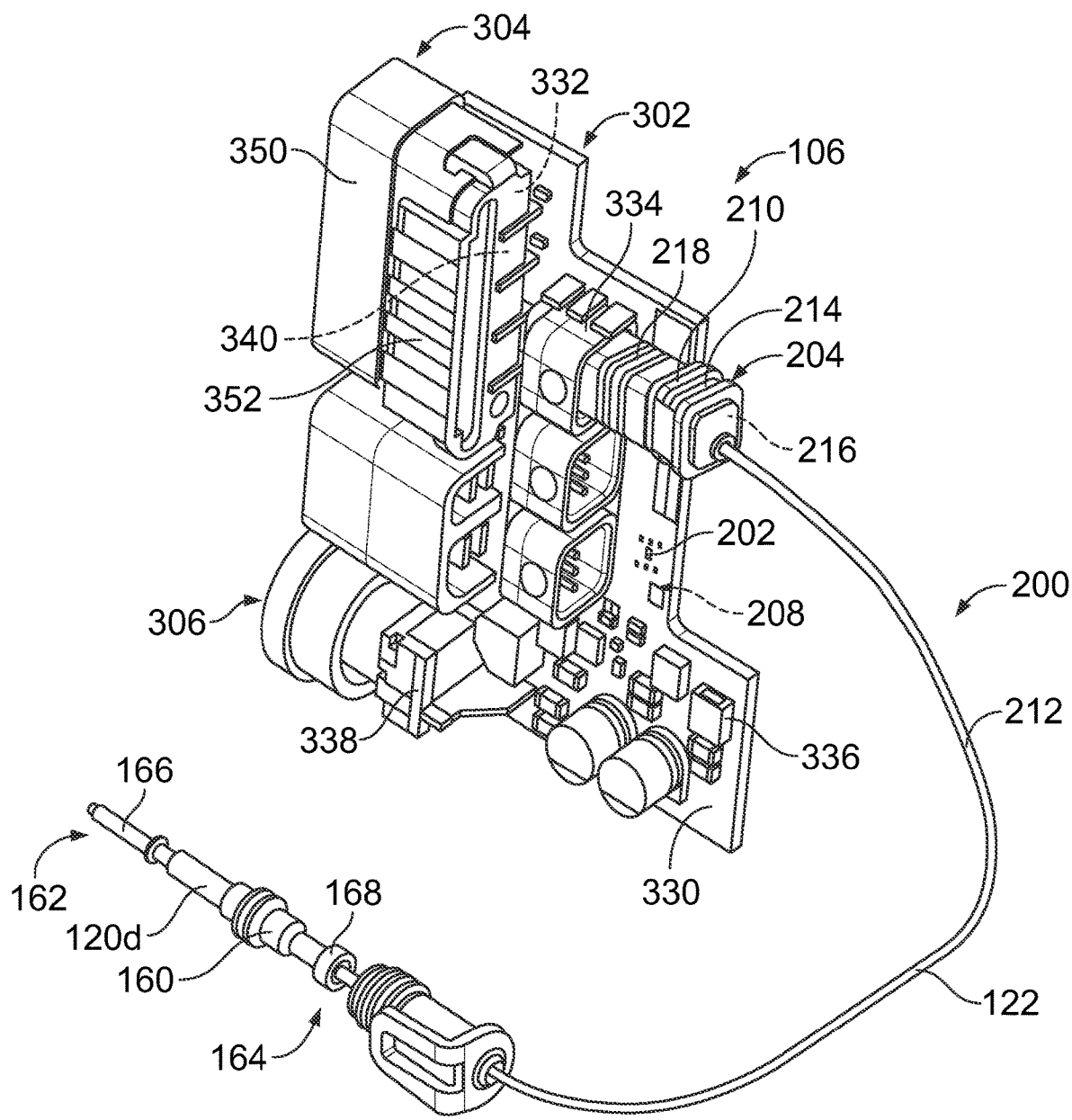
FIG. 5 is a rear perspective view of a portion of the charging inlet assembly showing the proximity resistor assembly and a portion of the human machine interface (HMI) assembly in accordance with an exemplary embodiment.

FIG. 4 is a rear perspective view of a portion of the charging inlet assembly 100 showing the proximity resistor assembly 200 and the human machine interface (HMI) assembly 106 in accordance with an exemplary embodiment. FIG. 5 is a rear perspective view of a portion of the charging inlet assembly 100 showing the proximity resistor assembly 200 and a portion of the human machine interface (HMI) assembly 106 in accordance with an exemplary embodiment. FIGS. 4 and 5 show the proximity resistor assembly 200 connected to the proximity terminal 120d.

The proximity terminal 120d includes a main body 160 extending between a mating end 162 and a terminating end 164. In an exemplary embodiment, a terminal seal 165 is coupled to the main body 160. The terminal seal 165 is configured to be sealed to the housing 110 when the AC terminal 120 is received in the AC terminal channel 116. The AC terminal 120 includes a mating pin 166 at the mating end 162. The mating pin 166 is presented at the front 130 of the housing 110 for mating with the charging connector. The AC terminal 120 includes a crimp barrel 168 at the terminating end 164 for electrical connection (for example, crimping) with the AC cables 122. Other types of terminating ends may be provided in alternative embodiments, such as a weld pad.

The HMI assembly 106 includes an interface housing 300, an interface controller 302, a lens assembly 304, and an actuator unlock assembly 306. The interface housing 300 holds the interface controller 302, the lens assembly 304, and the actuator unlock assembly 306. In an exemplary embodiment, the interface housing 300 includes a chamber 308 that receives the interface controller 302, the lens assembly 304, and the actuator unlock assembly 306. The interface housing 300 is configured to be coupled to the housing 110, such as at the rear 132 of the housing 110. The interface housing 300 positions the interface controller 302, the lens assembly 304, and the actuator unlock assembly 306 relative to the housing 110 when coupled thereto.

The interface housing 300 includes walls 310 defining the chamber 308. The interface housing 300 extends between a front 312 and a rear 314. The interface housing 300 includes a top 316 and a bottom 318. The interface housing 300 includes sides 320, 322 between the front 312 and the rear 314 and between the top 316 and the bottom 318. The interface housing 300 includes receptacles 324 at the rear 314. The receptacles 324 may receive contacts, connectors, wires or other electrical components configured to be electrically connected to the interface controller 302. For example, the receptacles 324 may receive a portion of the proximity resistor assembly 200.

In an exemplary embodiment, the interface controller 302 includes a control circuit board 330, one or more charging indicators 332 coupled to the control circuit board 330, one or more board connectors 334 coupled to the control circuit board 330, circuit components 336 coupled to the control circuit board 330, and an actuator controller 338 coupled to the control circuit board 330. In an exemplary embodiment, a resistor of the proximity resistor assembly 200 is coupled to the control circuit board 330. The board connectors 334 are configured to be connected to other components, such as corresponding AC terminals or the vehicle control system to control operation of the charging inlet assembly 100 and/or functions of the HMI assembly 106. Each connector 334 may include a connector housing and a contact held by the connector housing and mounted to the control circuit board 330. Control signals may be received by the connectors 334 to control operation of the HMI assembly 106, such as to control the charging indicators 332. The connectors 334 are aligned with the receptacles 324, such as for mating with mating connectors or wires extending to other components of the charging inlet assembly 100. The circuit components 336 may include capacitors, resistors, processors, LED drivers, or other types of circuit components used for controlling operation of the interface controller 302. The actuator controller 338 is aligned with the actuator unlock button 154 and configured to be operably coupled to the actuator controller 338. For example, when the actuator controller 338 is pressed, the actuator controller 338 is operated, such as to unlock the latching actuator 158.

In an exemplary embodiment, the charging indicators 332 include LEDs 340. The LEDs 340 are activated to provide visual indication of a charging status of the charging inlet assembly 100. For example, one or more of the LEDs 340 may be activated to indicate if charging is occurring (ON/OFF). One or more of the LEDs 340 may be activated to indicate if charging is delayed. One or more of the LEDs 340 may be activated to indicate the charge level (for example, low charge, medium charge, full charge, and the like).

The lens assembly 304 includes a lens holder 350 holding one or more lenses 352. The lenses 352 are configured to be aligned with the LEDs 340 to receive light from the LEDs 340. The lens assembly 304 is received in the rear cavity 150. In various embodiments, the lens assembly 304 may be coupled to the control circuit board 330 and loaded into the rear cavity 150 with the control circuit board 330. The lenses 352 are configured to be aligned with corresponding indicator openings 152 to direct the light from the LEDs 340 to the indicator openings 152.

During assembly, the lens assembly 304 is loaded into the rear cavity 150, such as through the rear of the housing 110. The lens assembly 304 may be positioned relative to the housing 110 using locating features, such as datum surfaces, guide surfaces, or other types of locating features. The lens holder 350 may be held in the rear cavity 150 by an interference fit. During assembly, the interface controller 302 is loaded into the rear cavity 150. The interface controller 302 is positioned in the rear cavity 150 such that the LEDs 340 are aligned with the lenses 352 of the lens assembly 304. During assembly, the interface housing 300 is coupled to the housing 110 to cover the interface controller 302. A portion of the interface housing 300 may be loaded into the rear cavity 150. In alternative embodiments, the lens assembly 304 and/or the interface controller 302 may be loaded into the interface housing 300 prior to coupling to the housing 110. Once assembled, the interface housing 300 protects the interface controller 302 and the lens assembly 304 and/or retains the interface controller 302 and the lens assembly 304 in the rear cavity 150. Once assembled, the HMI assembly 106 is fixed to the housing 110 and is secured to the vehicle with the housing 110.

In an exemplary embodiment, the proximity resistor assembly 200 includes a resistor 202 and a cable connector 204. The proximity resistor assembly 200 may additionally include a vehicle cable connector 206. The resistor 202 is coupled to the control circuit board 330. For example, the resistor 202 may be coupled to a proximity circuit 208 of the control circuit board 330. The proximity circuit 208 may be defined by one or more traces and/or circuit components of the control circuit board 330. In an exemplary embodiment, the proximity circuit 208 is connected to a circuit ground, such as a ground plane of the control circuit board 330, through the resistor 202. In various embodiments, the resistor 202 may be soldered to the proximity circuit 208.

The cable connector 204 includes a connector 210 and a cable 212 extending between the connector 210 and the proximity terminal 120*d*. The connector 210 includes a connector housing 214 and a contact 216 held by the connector housing 214. The contact 216 is terminated to an end of the cable 212. For example, the contact 216 may be soldered to the end of the cable 212 or crimped to the end of the cable 212. The other end of the cable 212 may be soldered or crimped to the terminating end of the proximity terminal 120*d*. The connector 210 is configured to be connected with the board connector 334. For example, the connector 210 may be a plug connector and the board connector 334 may be a receptacle connector configured to receive the connector 210, or vice versa. The connector 210 is configured to be plugged into the receptacle 324 to mate with the board connector 334. In an exemplary embodiment, the connector 210 includes a perimeter seal 218 around the outer perimeter of the connector housing 214. The perimeter seal 218 is configured to be sealed to the interface housing 300 when the connector 210 is plugged into the receptacle 324. When mated, the contact 216 is electrically connected to a contact of the board connector 334 to electrically connect the cable connector 204 to the control circuit board 330, such as to the proximity circuit 208. The cable 212 transmits proximity signals from the proximity terminal 120*d* to the proximity circuit 208 through the connectors 210, 334.

In an exemplary embodiment, the proximity resistor assembly 200 includes a cable seal 213 coupled to the cable 212. The cable seal 213 is configured to be sealed against the cable 212. The cable seal 213 may be provided proximate to the end of the cable 212 that is terminated to the proximity terminal 120*d*. In an exemplary embodiment, the cable seal 213 is received in the DC terminal channel 118 to seal against the housing 110.

The vehicle cable connector 206 includes a connector 220 and a cable 222 extending between the connector 220 and a vehicle electronics module 230. The vehicle electronics module 230 may be used to control a charging operation of the charging inlet assembly 100. The vehicle electronics module 230 may be part of the battery distribution unit. The connector 220 includes a connector housing 224 and a contact 226 held by the connector housing 224. The contact 226 is terminated to an end of the cable 222. For example, the contact 226 may be soldered to the end of the cable 222 or crimped to the end of the cable 222. The other end of the cable 222 may be soldered to the vehicle electronics module 230 or connected to a connector coupled to the vehicle electronics module 230. Proximity signals are transmitted from the proximity terminal 120*d* to the vehicle electronics module 230 through the cable connector 204, through the proximity circuit 208 on the control circuit board 330 of the HMI assembly 106, and through the vehicle cable connector 206. As such, the proximity signal passes through the resistor 202 prior to transmission through the vehicle cable connector 206 to the vehicle electronics module 230. The connector 220 is configured to be connected with the corresponding board connector 334. For example, the connector 220 may be plugged into the receptacle 324 to mate with the board connector 334. When mated, the contact 226 is electrically connected to a contact of the board connector 334 to electrically connect the cable connector 204 to the control circuit board 330, such as to the proximity circuit 208. The cable 222 transmits proximity signals from the proximity circuit 208 to the vehicle electronics module 230.

The resistor 202 and the proximity circuit 208 are used to satisfy signaling requirements for the charging inlet assembly 100. For example, in an exemplary embodiment, the resistor 202 is a 2.7 kOhm resistor, which is required for operation to satisfy standards for charging system for electric vehicles, such as the SAE J1772 North American Standard. The resistor 202 and proximity circuit 208 are provided on the control circuit board 330 of the HMI assembly 106. Providing the resistor 202 and proximity circuit 208 on the control circuit board 330 of the HMI assembly 106 eliminates the need for an additional printed circuit board or other circuitry at the AC section 112, which may reduce the overall size of the charging inlet assembly 100 compared to charging inlet assemblies having separate control circuit boards and housing spaces for such control circuit boards. The cable connector 204 provides a reliable and convenient connection between the proximity terminal 120d and the HMI assembly 106. Assembly can be made quickly and easily.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet assembly comprising:
    a housing extending between a front and a rear, the housing having a DC section including DC terminal channels, the housing having an AC section including AC terminal channels, the DC section configured for mating with a DC charging connector at the front, the AC section configured for mating with an AC charging connector at the front;
    DC terminals received in the corresponding DC terminal channels for mating with the DC charging connector, the DC terminals including a proximity terminal;
    AC terminals received in the corresponding AC terminal channels for mating with the AC charging connector; and
    a human machine interface (HMI) assembly coupled to the rear of the housing, the HMI assembly including a control circuit board, the HMI assembly including a charging indicator coupled to the control circuit board, the charging indicator being visible from the front of the housing to indicate a charging status of the charging inlet assembly; and
    a proximity resistor assembly coupled to the housing, the proximity resistor assembly including a resistor coupled to the control circuit board, the proximity resistor assembly including a cable connector connected between the control circuit board and the proximity terminal.

2. The charging inlet assembly of claim 1, wherein the cable connector includes a cable and a contact at a first end of the cable, the contact being electrically connected to the control circuit board, a second end of the cable being terminated to the proximity terminal.

3. The charging inlet assembly of claim 1, wherein the cable connector transmits proximity signals between the proximity terminal and the control circuit board.

4. The charging inlet assembly of claim 3, wherein the proximity signals are used to control operation of the charging indicator.

5. The charging inlet assembly of claim 1, wherein the resistor is connected to a proximity circuit of the control circuit board, the proximity resistor assembly further comprising a vehicle cable connector connected between the proximity circuit of the control circuit board and a vehicle electronics module used to control a charging operation of the charging inlet assembly.

6. The charging inlet assembly of claim 1, wherein the housing includes an HMI section discrete from the DC section and the AC section, the HMI assembly coupled to the housing at the HMI section.

7. The charging inlet assembly of claim 6, wherein the housing includes a rear cavity at the HMI section, the HMI assembly being received in the rear cavity, the resistor being located in the rear cavity.

8. The charging inlet assembly of claim 6, wherein the HMI section is offset toward a first side of the housing from the DC section and the AC section.

9. The charging inlet assembly of claim 1, wherein the control circuit board includes a front edge and a rear edge, the control circuit board having a mounting surface between the front edge and the rear edge, the resistor being coupled to the mounting surface, the control circuit board being coupled to the housing with the front edge being forward facing and the rear edge being rearward facing.

10. The charging inlet assembly of claim 1, wherein the HMI assembly includes an interface housing having a chamber, the chamber receives the control circuit board, the cable connector being connected to the interface housing.

11. The charging inlet assembly of claim 10, wherein the interface housing includes a receptacle, the HMI assembly including a board connector mounted to the control circuit board, the board connector being located in the receptacle, the cable connector being plugged into the receptacle to mate with the board connector.

12. The charging inlet assembly of claim 1, wherein the cable connector includes a cable, the proximity resistor assembly including a cable seal coupled to the cable, the cable seal being received in the DC terminal channel to seal against the housing.

13. A charging inlet assembly comprising:
a housing extending between a front and a rear, the housing having a DC section including DC terminal channels, the housing having an AC section including AC terminal channels, the housing having a human machine interface (HMI) section discrete from the DC section and the AC section, the DC section configured for mating with a DC charging connector at the front, the AC section configured for mating with an AC charging connector at the front, the housing including a rear cavity at the HMI section, the rear cavity being separate from the DC terminal channels and from the AC terminal channels;
DC terminals received in the corresponding DC terminal channels for mating with the DC charging connector, the DC terminals including a proximity terminal;
AC terminals received in the corresponding AC terminal channels for mating with the AC charging connector; and
an HMI assembly received in the rear cavity, the HMI assembly including a control circuit board, the HMI assembly including a charging indicator coupled to the control circuit board, the charging indicator located within the HMI section and being visible from the front of the housing to indicate a charging status of the charging inlet assembly; and
a proximity resistor assembly coupled to the housing, the proximity resistor assembly including a resistor coupled to the control circuit board, the proximity resistor assembly including a cable connector connected between the control circuit board and the proximity terminal.

14. The charging inlet assembly of claim 13, wherein the HMI section is offset toward a first side of the housing from the DC section and the AC section.

15. The charging inlet assembly of claim 13, wherein the cable connector includes a cable and a contact at a first end of the cable, the contact being electrically connected to the control circuit board, a second end of the cable being terminated to the proximity terminal.

16. The charging inlet assembly of claim 13, wherein the cable connector transmits proximity signals between the proximity terminal and the control circuit board, the proximity signals being used to control operation of the charging indicator.

17. The charging inlet assembly of claim 13, wherein the HMI assembly includes an interface housing having a chamber, the chamber receives the control circuit board, the interface housing includes a receptacle, the HMI assembly including a board connector mounted to the control circuit board, the board connector being located in the receptacle, the cable connector being plugged into the receptacle to mate with the board connector.

18. The charging inlet assembly of claim 13, wherein the cable connector includes a cable, the proximity resistor assembly including a cable seal coupled to the cable, the cable seal being received in the DC terminal channel to seal against the housing.

19. A charging inlet assembly comprising:
a housing extending between a front and a rear, the housing having a DC section including DC terminal channels, the housing having an AC section including AC terminal channels, the DC section configured for mating with a DC charging connector at the front, the AC section configured for mating with an AC charging connector at the front;
DC terminals received in the corresponding DC terminal channels for mating with the DC charging connector, the DC terminals including a proximity terminal;
AC terminals received in the corresponding AC terminal channels for mating with the AC charging connector; and
a human machine interface (HMI) assembly coupled to the rear of the housing, the HMI assembly including a control circuit board, the HMI assembly including a charging indicator coupled to the control circuit board, the charging indicator being visible from the front of the housing to indicate a charging status of the charging inlet assembly; and
a proximity resistor assembly coupled to the housing, the proximity resistor assembly including a resistor and a cable connector, the resistor coupled to a proximity circuit of the control circuit board, the resistor coupled to a ground of the control circuit board, the cable connector including a contact connected to the proximity circuit of the control circuit board, the cable connector including a cable connected between the contact and the proximity terminal to receive a proximity signal from the proximity terminal.

20. The charging inlet assembly of claim 19, wherein the housing includes an HMI section discrete from the DC section and the AC section, the HMI assembly coupled to the housing at the HMI section, the HMI section is offset toward a first side of the housing from the DC section and the AC section.

* * * * *